United States Patent
Kherani et al.

(10) Patent No.: US 8,756,430 B2
(45) Date of Patent: Jun. 17, 2014

(54) EXPLOITING APPLICATION CHARACTERISTICS FOR MULTIPLE-AUTHENTICATOR BROADCAST AUTHENTICATION SCHEMES

(75) Inventors: Arzad A. Kherani, Mahasamund (IN); Debojyoti Bhattacharya, Bangalore (IN); Skanda N. Muthaiah, Bangalore (IN)

(73) Assignee: GM Global Technology Operations LLC, Detroit, MI (US)

( * ) Notice: Subject to any disclaimer, the term of this patent is extended or adjusted under 35 U.S.C. 154(b) by 253 days.

(21) Appl. No.: 13/086,864

(22) Filed: Apr. 14, 2011

(65) Prior Publication Data

US 2012/0265995 A1 Oct. 18, 2012

(51) Int. Cl.
*H04L 9/32* (2006.01)
(52) U.S. Cl.
USPC ............ 713/179; 713/168; 713/176; 380/246
(58) Field of Classification Search
USPC .................. 713/176–179, 168; 709/238, 246; 726/26–30; 380/246
See application file for complete search history.

(56) References Cited

U.S. PATENT DOCUMENTS

| | | | |
|---|---|---|---|
| 7,324,893 B2 * | 1/2008 | Yamashita et al. ............. | 701/117 |
| 8,295,257 B2 * | 10/2012 | Chen et al. ..................... | 370/338 |
| 2005/0134440 A1 * | 6/2005 | Breed ............................ | 340/435 |
| 2006/0200856 A1 * | 9/2006 | Salowey et al. ................... | 726/5 |
| 2008/0002635 A1 * | 1/2008 | Mosko et al. ................. | 370/338 |
| 2008/0235509 A1 * | 9/2008 | Laberteaux et al. .......... | 713/156 |
| 2009/0254754 A1 * | 10/2009 | Bellur et al. .................. | 713/176 |
| 2010/0019892 A1 * | 1/2010 | Roh et al. ...................... | 340/436 |
| 2010/0235891 A1 * | 9/2010 | Oglesbee et al. ................. | 726/5 |

OTHER PUBLICATIONS

Multilevel µTESLA: Broadcast Authentication for Distributed Sensor Networks, Donggang Liu and Peng Ning, North Carolina State University, pp. 801-835.*
Iyer, A., Kherani, A., Rao, A., and Karnik, A. "Secure V2V Communications: Performance Impact of Computational Overheads." IEEE 2008.
"General Motors vehicle to vehicle (V2V) technology." www.acarplace.com/brands/gm/vehicle-to-vehicle.html. Jun. 29, 2010.
"Network Simulation Results from the VSC-A* Project as Performed by Mercedes-Benz RDNA." IEEE P1609 Meeting. Jun. 16-18, 2009.
Ren, K., Lou, W., and Zhang, Y. "Multi-user Broadcast Authentication in Wireless Sensor Networks."
Weigle, M. "Safety Applications." Spring 2008.

* cited by examiner

*Primary Examiner* — Amare F Tabor
(74) *Attorney, Agent, or Firm* — Parks IP Law LLC; Mickki D. Murray, Esq.

(57) ABSTRACT

A method for securing communications in a vehicle-to-vehicle (V2V) system including an on-board computer of a broadcasting vehicle predicting a value for a vehicle parameter, generating a heavyweight signature corresponding to the predicted value, and obtaining an actual value for the vehicle parameter. The method also includes the computer comparing the predicted value to the actual value to determine if the predicted value bears a first relationship to the actual value. If the computer determines that the predicted value bears the relationship to the actual value, the on-board computer generates a lightweight authenticating signature to correspond to the predicted value and broadcasts a data message having the predicted value with the corresponding heavyweight authenticating signature and the corresponding lightweight authenticating signature.

17 Claims, 5 Drawing Sheets

EXPLOITING APPLICATION CHARACTERISTICS FOR MULTIPLE-AUTHENTICATOR BROADCAST AUTHENTICATION SCHEMES

TECHNICAL FIELD

The present disclosure relates generally to systems and methods for improving secure wireless communications and, more particularly, to systems and methods for improving the efficiency and effectiveness of secure wireless communications between automotive vehicles.

BACKGROUND

Many modern vehicles include one or more sensors for evaluating the local environment around them. Many vehicles also communicate with other vehicles using vehicle-to-vehicle (V2V) methods. In V2V systems, vehicles exchange messages including operational parameters such as location and kinematical details (e.g., velocity). Primary benefits of such sensor and V2V systems include safety and facilitation of driving.

For example, the computer of a first vehicle can advise the driver that another vehicle is positioned in its blind spot. The computer may have received data about the neighboring vehicle from the vehicle sensors and/or from a V2V message from the other vehicle. The other vehicle could also communicate to the first vehicle that it is accelerating or decelerating, planning to switch lanes away from the first vehicle (e.g., turn blinker initiated), etc.

Due to the importance of the information shared in V2V systems, transmissions are secured. One way of securing wireless communications is by using a Broadcast Authentication Scheme (BAS). BASs for vehicular wireless networks enable secure transmission and receipt of messages between vehicles. BAS, though, at least intermittently occupy a relatively large amount of limited vehicle computing resources.

One drawback of BAS is time delay between initial transmission of a message from the broadcasting vehicle and authentication of the messages at the receiving vehicles. During the delay, vehicle location and movements change, rendering the message less reliable. Also, the strain placed on vehicle computers for BAS computations increase sometimes leading to packet loss and increased system vulnerability, such as to denial-of-service (DoS) attacks.

SUMMARY

The present disclosure relates to a method for securing communications between automotive vehicles in a vehicle-to-vehicle (V2V) communications system. The method includes an on-board computer of a broadcasting vehicle (1) predicting a value for a vehicle parameter, (2) generating a heavyweight authenticating signature to correspond to the predicted value, and (3) obtaining an actual value for the vehicle parameter. The method also includes the on-board computer of the broadcasting vehicle comparing the predicted value for the vehicle parameter to the actual value for the vehicle parameter to determine if the predicted value bears a first relationship (e.g., a predetermined relationship) to the actual value. If the on-board computer of the broadcasting vehicle determines in the comparing step that the predicted value bears the first predetermined relationship to the actual value, the on-board computer of the broadcasting vehicle (i) generates a lightweight authenticating signature to correspond to the predicted value and (ii) broadcasts a data message having the predicted value with the corresponding heavyweight authenticating signature and the corresponding lightweight authenticating signature.

In another aspect, the present disclosure relates to a method for securing communications between automotive vehicles in a vehicle-to-vehicle (V2V) communications system according to a prediction-and-multiple-authenticator protocol. The method includes the on-board computer of the broadcasting vehicle (i) generating a first value for the vehicle parameter, (ii) preparing a first authenticating signature, having a first security level, to correspond with the first value for the vehicle parameter, and (iii) preparing a predicted, second value for the vehicle parameter having lower accuracy than the first value for the vehicle parameter. The method also includes the on-board computer of the broadcasting vehicle (iv) generating a second security authenticating signature to correspond with the predicted, second value for the vehicle parameter, the second authenticating signature having a lower security level than the security level of the first authenticating signature, (v) preparing and broadcasting a data message including the first value, the second, predicted value, and corresponding authenticating signatures. The method also includes an on-board computer of a receiving vehicle (v) receiving the data message, (vi) determining which level of data accuracy it requires or prefers, (vii) processing the authenticating signature corresponding to the required level of data accuracy, and (viii) then, the on-board computer of the receiving vehicle utilizing the data having the required or preferred accuracy.

In another aspect, the present disclosure relates to a method for securing communications between automobiles in a vehicle-to-vehicle (V2V) communications system according to a delayed-authentication protocol. The method includes an on-board computer of a broadcasting vehicle determining whether to predict a future value for a vehicle parameter. If the on-board computer of the broadcasting vehicle determines in the determining step to predict a future value, the computer (1) predicting a future value for the vehicle parameter, (2) generating, using an authenticating key, an authenticating signature to correspond to the predicted future value, (3) preparing and broadcasting an initial, predicted-value message including the predicted value and the corresponding authenticating signature, and (4) preparing and broadcasting a subsequent predicted-value message including the authenticating key, for use by the receiving vehicles to authenticate the authenticating signature received in the initial predicted-value message for using the predicted value received in the initial predicted-value message.

In yet another aspect, the present disclosure relates to a method for securing communications between automobiles in a vehicle-to-vehicle (V2V) communications system according to a delayed-authentication protocol. The method includes an on-board computer of a broadcasting vehicle (i) predicting a future value for a vehicle parameter, (ii) generating a first authenticating signature, using an authenticating key, to correspond to the predicted future value, and (iii) preparing and broadcasting an initial message including the predicted future value and first authenticating signature. The method also includes the on-board computer of the broadcasting vehicle (iv) preparing an actual value of the vehicle parameter, (v) generating a second authenticating signature to correspond to the actual value, and (vi) preparing and broadcasting a subsequent message including the actual value, the second authenticating signature, and the authenticating key used to generate the first authenticating signature, so that receiving vehicles can determine which of the first authenticating signature and the second authenticating signature to process for accessing the predicted value or the actual value, respectively.

Other aspects of the present invention will be in part apparent and in part pointed out hereinafter.

DETAILED DESCRIPTION

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

While the description includes a general context of computer-executable instructions, the present disclosure can also be implemented in combination with other program modules and/or as a combination of hardware and software. The term "application," or variants thereof, is used expansively herein to include routines, program modules, programs, components, data structures, algorithms, and the like. Applications can be implemented on various system configurations, including single-processor or multiprocessor systems, microprocessor-based electronics, combinations thereof, and the like.

General Overview of the Disclosure

The present disclosure describes systems and methods for improving the effectiveness and efficiency of wireless communication between nodes in systems such as vehicle-to-vehicle (V2V) communication systems. Improvements are achieved by exploiting characteristics of the vehicle applications using the data in the communications and of authentication schemes, such as multiple-authenticator Broadcast Authentication Schemes (MBAS).

According to one embodiment, the processor of a broadcasting vehicle predicts a future data parameter and generates a computationally intensive, or heavyweight, authenticator. The processor later determines an actual value for the parameter, generates a less intensive authenticator, and broadcasts the predicted and actual values with the two authenticators. In some particular embodiments, the processor of the broadcasting vehicle confirms that the predicted value is within a threshold of the actual value before including the predicted value in the message. The processors of receiving vehicles can determine to use the predicted value, for which the heavyweight authenticator was generated, or actual value, for which the lightweight authenticator was generated.

Benefits of the present methods and systems include savings in time and computing by the processor of the broadcasting vehicle and/or the processor of the receiving vehicles.

Although the present invention is primarily described by way of example with respect to V2V systems, wherein system nodes include vehicles, the present disclosure can be used to improve secure wireless communication between other types of processing nodes having limited computing resources.

Multiple-Authenticator Broadcast Authentication Schemes

As described in the Background section, above, BAS systems help ensure secure and reliable exchange of messages. One type of BAS is a multiple-authenticator BAS (MBAS). In the MBAS, a broadcast message includes at least two authenticating signatures, also known as authenticators. One of the authenticating signatures is more computationally intensive than the other(s)—i.e., requires more computing resources for generation and interpretation upon receipt. Accordingly, at least two of the authenticating signatures can be referred to as relatively heavyweight and lightweight authenticating signatures.

Two-Authenticator Schemes

One particular MBAS protocol uses two one-time digital signatures (OTS). A particular example is a W-OTA/ECDSA scheme, wherein each signature includes a lightweight authenticating signature in the form of a Merkle-Winternitzo one-time authentication (W-OTA) authenticating signature, and a heavyweight authenticating signature in the form of an Elliptic Curve Digital Signature Algorithm (ECDSA) authenticating signature.

In operation, a processor of a broadcasting vehicle generates a tag including the heavy and lightweight authenticating signatures according to the protocol and attaches it to a message. Each receiving vehicle receives the message and verifies that it is a reliable message by processing at least one authenticator of the tag.

Depending upon the number and type of authenticator that constitutes the tag, tag generation generally requires much more of the broadcaster's resources than verification requires of each receiver's resources. As such, the generation is said to be much more costly in terms of processing requirements compared to verification operation at the receiver per transmitting source.

A broadcast authentication protocol between a sender and a set of receivers enables the sender to send information to the receivers in a secure manner. The authentication protocol used in the broadcast networks being discussed includes three steps, namely, key generation and public key distribution, signature generation, and signature verification. For key generation and public key distribution, the sender executes a key generation algorithm for the authentication protocol and creates the public key, the private key, and other variables. The sender then disseminates the public key to the receivers. The private key is known only to the sender. When the sender needs to send an authentic message, the sender creates the message and populates it with the appropriate information, and then uses a signature generation algorithm for the authentication protocol. The signature generation algorithm takes the message and the private key as input and produces a signature for the message. The signature is also referred to as an authentication tag or authenticator. Therefore the authentication tag or the signature is message dependent. For verification, when a receiver needs to verify the authenticity of a received message, the receiver requires the public key corresponding to the private key that signed the message. The signature verification algorithm takes the message, the authentication tag (signature) and public key as input and produces an affirmative result (e.g., analogous to a "yes" response) if the authentication tag is correct or a negative result (e.g., "no") if it is incorrect.

A multiple authenticator BAS is typically associated with as many public-private key pairs as there are number of authenticators. The broadcasting vehicle uses distinct private keys to authenticate data and generate an authenticating signature. On the other hand, the receiving vehicle has in its disposal the set of all public keys required to verify each of the authenticating signatures in the multiple authenticators. When a message is received from the transmitting vehicle, the receiving vehicle will employ one of the multiple public keys to verify one of the authenticators. Upon successful verification, the data is sent for application processing.

Another type of MBAS uses two or more authenticating signatures. The Multiple ECDSA based Digital Signature Scheme (MEDSS) is based on ECDSA. According to the MEDSS, the processor of a broadcasting vehicle prepares a message having two or more unique authenticating signatures having various levels of security to correspond with two or more respective versions of data for the same vehicle parameter or parameters. Each version of the data has a different degree of accuracy borne out of approximating or predicting data. The data versions may include, for example, an actual value for the vehicle parameter, having maximum accuracy, to values predicted within various degrees of accuracy—i.e., from relatively-slight to relatively-large approximations. Generally, higher-security, and thus more computationally costly, authenticating signatures are associated with higher-accuracy data.

In one embodiment, data includes (i) high, (ii) moderate, and (iii) low accuracy versions of the broadcasting vehicle operating parameters, and the signatures include corresponding (i) high-security, heavyweight, (ii) moderate-security, and (iii) low-security, lightweight, authenticating signatures. The level of security is proportionate to the processing requirement, and so generally also proportionate to the required processing time. In MBAS based on ECDSA, the level of security is determined by, and proportional to, the key length of the private keys. For example, a 256-bit private key provides 128-bits of security, while a 192-bit private key provides 96 bits of security, and so on. Generating and/or verifying an authenticator using a 256-bit private key takes approximately 2 to 3 times as long as generating an authenticator using a 192-bit private key.

In some embodiments, the processor of the broadcasting vehicle and/or the processor of a receiving vehicle determine which signature(s) of the various signatures to process. In making the determinations, the processors may consider variables such as (1) present and/or expected processing resources of the vehicle, (2) tolerance for inaccurate data of the application(s) to use the data in the message, (3) tolerance for delay in data reception for the application(s), and (4) desired level of security for the data in the message. In this way, the systems and methods of the present disclosure exploit the broadcast schemes and vehicle applications using the data in the broadcast messages.

Transmitter-Centric Prediction and Advanced Signature Generation

According to one embodiment, the on-board computer of each participating vehicle is programmed with an advanced-processing program. The program, as all programs disclosed herein, may be stored as instructions on a computer-readable medium, such as a memory of a vehicle on-board computer system. In some embodiments, the advanced-processing program is made a part of the MBAS protocol, itself, while in others it is separate from and works in conjunction with the MBAS protocol. The advanced-processing program can be used to improve the MBAS described herein and other MBAS.

Figure 1:
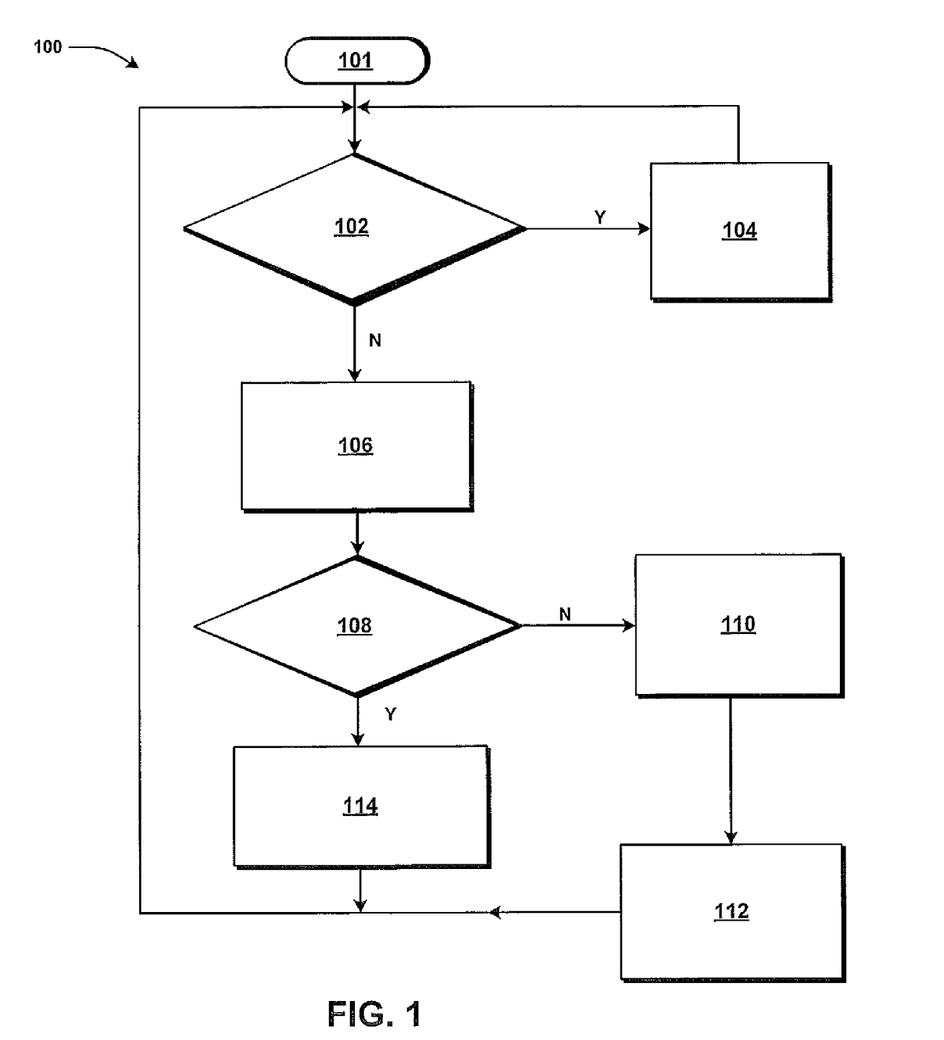
FIG. 1 illustrates an exemplary method for predicting vehicle parameters and pre-processing authentication information for broadcast, according to an embodiment of the present disclosure.

FIG. 1 shows an exemplary method 100 for predicting vehicle parameters and pre-processing authentication information, according to the advanced-processing program of an embodiment of the present disclosure. It should be understood that the steps of the method 100 are not necessarily presented in any particular order and that performance of some or all the steps in an alternative order is possible and is contemplated.

The steps have been presented in the demonstrated order for ease of description and illustration. Steps can be added, omitted and/or performed simultaneously without departing from the scope of the appended claims. It should also be understood that the illustrated method 100 can be ended at any time. In certain embodiments, some or all steps of this process, and/or substantially equivalent steps are performed by execution of computer-readable instructions stored or included on a computer readable medium, for example. For instance, references to a processor performing functions of the present disclosure refer to any one or more interworking computing components executing instructions provided on a computer-readable medium, such as a memory associated with the processor.

The method 100 begins 101 and flow proceeds to step 102, whereat a processor of a vehicle originating a broadcast (broadcasting vehicle) determines whether to predict a future value for a vehicle parameter (e.g., vehicle location) and pre-process an authenticating signature for later transmission with the predicted value. For example, at step 102, the processor determines whether its resources are above or below a threshold value. In some embodiments, the threshold includes a single factor, such as kilobytes of memory being used at the time or effective present processor operating speed, e.g., megabytes per second.

In some contemplated embodiments, the threshold employed in step 102 includes a combination of multiple factors, such as memory usage and effective present operating speed. For example, the threshold may be exceeded when the present memory usage is above a preset usage value and/or the effective present operating speed is below a preset speed value. In another contemplated embodiment, the threshold may consider a combination of weighted representations of the factors, whereby at least one factor is accorded a weight being higher than a weight for at least one other factor in the evaluation.

The broadcasting vehicle may use data related to inherent characteristics or operating variables of the receiving vehicle(s) in a variety of ways, such as based information corresponding to an identity of the receiving vehicle and/or information received from the receiving vehicle(s).

In some embodiments, the processor considers, alone or in combination with other factors, a tolerance for delay of the application of the receiving vehicle to use the message data.

For example, an emergency application, such as a collision avoidance application will be very sensitive to delay. A simple application performing a greeting, or "handshake," on the other hand, would be much less sensitive to delay. In implementation, the processor of the broadcasting vehicle may determine, based on the delay tolerance of one or multiple applications for which messages are pertinent, to preempt the transmission of data for the more tolerant application with a transmission of data for the less tolerant application. By providing data to the processes that need them the most, the effect of latency in the system is further reduced.

In other embodiments, the broadcasting vehicle evaluates the receiver's sensitivity to loss of information. The broadcasting vehicle may have or determine the receiver's sensitivity based on information in a message(s) from the receiver and/or information otherwise known to the broadcasting vehicle about the receiver's relevant computing application(s). Because adding more authenticators increases the packet size of the packet, which correspondingly leads to more losses in the medium, the broadcasting vehicle may pack more authenticators in scenarios where more losses can be tolerated without leading to performance degradation, while in more-sensitive scenarios, the number and type of authenticators may be reduced to meet an expected performance requirement.

Exemplary vehicle parameters include location and kinematic parameters such as speed, velocity, and acceleration. The vehicle may be equipped with conventional and/or state-of-the-art components for determining vehicle parameters. For example, the vehicle processor may receive signals associated with the speedometer and braking systems of the vehicle, a Global Positioning System (GPS), that determines location coordinates, and an inertial measurement unit (IMU), such as a three-axis accelerometer, that measures vehicle acceleration.

If the processor of the broadcasting vehicle determines in step 102 determines that it would not likely be beneficial to predict a value for the vehicle parameter and pre-process a corresponding heavyweight key, flow proceeds to step 104, whereat the processor does not predict a value for the vehicle parameter. From step 104, flow may return to step 102 for a subsequent evaluation of operating characteristics as described above.

If the processor of the broadcasting vehicle determines in step 102 that benefits would likely be obtained by pre-processing, flow proceeds to step 106, whereat the processor predicts a future value for the vehicle parameter (e.g., broadcasting vehicle location and/or speed). The value is predicted with respect to a certain future time, referred to here for explanation purposes as time=F.

The processor computes the predicted value(s) in step 106 in one or more ways. For example, in one embodiment the processor computes the predicted value(s) using kinematic algorithms. For instance, the processor, using present location and present movement characteristics (e.g., velocity) of the vehicle, can predict a future location of the vehicle, such as a location at which the vehicle is expected to be one second into the future. The predicted parameter P of the vehicle (e.g., location or speed) for the future time can be represented by $P_F$. Some vehicle parameters are more conducive to being accurately predicted. For example, vehicular trajectories can be relatively well predicted because they generally vary relatively slowly.

At step 108, the processor, at the future time or slightly before the future time (time=F), obtains an actual present value for the at least one vehicle parameter $A_F$. In an optional function, present in some embodiments, the processor of the broadcasting vehicle, at the future time, or slightly before the future time, compares the actual value $A_F$ to the previously-computed predicted value $P_F$ to determine whether the predicted value $P_F$ bears a relation (e.g., predetermined relation) to the actual present value for the vehicle parameter $A_F$.

As an example consideration for the aforementioned optional evaluation of step 108, the program in some embodiments causes the processor of the broadcasting vehicle to determine whether the predicted value $P_F$ is within a preset tolerance $T_{BV}$ of the actual value $A_F$. The tolerance $T_{BV}$ may be based on one or more factors including, for example, the application for which the data is intended. In some of these embodiments, the tolerance $T_{BV}$ relates to a level of accuracy that an application expected to use the data can operate, so that more tolerant applications can operate with less accurate data and more tolerant applications require or prefer more accurate data. For instance, if the data, such as location, is expected to be critical to operation of an emergency application of the vehicles receiving the broadcast, then the tolerance $T_{BV}$ will be set very low, accordingly, so that the predicted value is only used if it is very close to the actual value.

In some contemplated embodiments, the program is configured to cause the processor of the broadcasting vehicle to consider relationships between the predicted value $P_F$ and the actual value $A_F$ other than, or in addition to, considering the difference between the predicted value $P_F$ and the actual value $A_F$. For instance, in one particular embodiment, the program is configured to cause the processor to pass the evaluation of step 108 (i.e., flow proceeds to step 114) if the predicted value $P_F$ is greater than the actual value $A_F$ and within the tolerance $T_{BV}$. In another particular embodiment, the program is configured to cause the processor to pass the evaluation of step 108 if $P_F$ is less than the actual value $A_F$ and within the tolerance $T_{BV}$. In yet another embodiment, the program is configured to cause the processor to pass the evaluation of step 108 if the predicted value $P_F$ is greater than the actual value $A_F$ and within a first tolerance $T_{BV1}$, or if $P_F$ is greater than the actual value $A_F$ and within a first tolerance $T_{BV2}$.

In one specific contemplated embodiment, the processor of the broadcasting vehicle includes an indicator with the message indicating that the predicted and actual values bear a relationship (e.g., predetermined relationship). The indicator can be a simple pass indication, or specifically identify additional details, such as the application for the data considered in the evaluation, the particular relationship (e.g., $|P_F - A_F| < T_{BV}$), etc.

If at step 108 the processor of the broadcasting vehicle determines that the predicted value $P_F$ does not bear the relationship to the actual value $A_F$, such as the predicted value $P_F$ not being within the preset tolerance $T_{BV}$ of the actual value $A_F$, then flow proceeds to step 110. If at step 108 the processor of the broadcasting vehicle determines that the predicted value $P_F$ bears the relationship to the actual value $A_F$, such as the predicted value $P_F$ being within the preset tolerance $T_{BV}$ of the actual value $A_F$, then flow proceeds to step 114.

At step 110, the processor of the broadcasting vehicle generates a heavyweight authenticating signature to correspond to the actual value $A_F$ and generates a lightweight authenticating signature to correspond to the actual value $A_F$. At step 110, the processor generates a message including the actual value and corresponding heavy and lightweight signatures and, at step 112, broadcasts the message. From step 112, flow may proceed back to step 102 for a subsequent consideration of whether its operating characteristics satisfy the required test, as described above.

At step 114, at the future time (time=F) for which the vehicle parameter $P_F$ was predicted (e.g., about 1 second following the determination of step 102 or the prediction of step 104), or just before the future time, the processor: (i) generates a lightweight authenticating signature to correspond to the actual value $A_F$ and (ii) generates a message including: (1) the predicted value $P_F$; (2) the pre-processed heavyweight signature generated in step 106 to correspond to the predicted value $P_F$; (3) the actual value $A_F$; and (4) the lightweight authenticating signature corresponding to the actual value $A_F$. The processor then (iii) broadcasts the message.

From step 114, flow proceeds back to step 102 for a subsequent consideration of whether its operating characteristics satisfy the required test, as described above.

The aforesaid method 100 may include additional processing in predicting at least one parameter value and, in some embodiments, in comparing the predicted value $P_F$ to an actual value $A_F$. The additional processing, though, is offset by the benefits, at least over multiple cycles of the method, of generating heavyweight authenticating signatures in advance, before actual scheduling of the corresponding broadcast and when the processor is less constrained, and broadcasting predicted parameters with the pre-generated heavyweight authenticating signatures when the processor is more constrained. In other words, the signing process and time at the future time can be reduced. Advantages are especially obtained when the advance processing is performed during a relatively idle time for the processor.

Advantages are further achieved in embodiments in which the predicting step 110 is only performed when resources are determined in step 106 to be relatively constrained at the future time (time=F). Advantages are also achieved in embodiments in which the step 114 of generating the heavyweight authenticating signature to be used with the predicted parameter is generated when the predicted value is determined in step 112 to be within a tolerance ($T_{BV}$) (e.g., a predetermined tolerance).

Receiver-Centric Signature Verification

Figure 2:
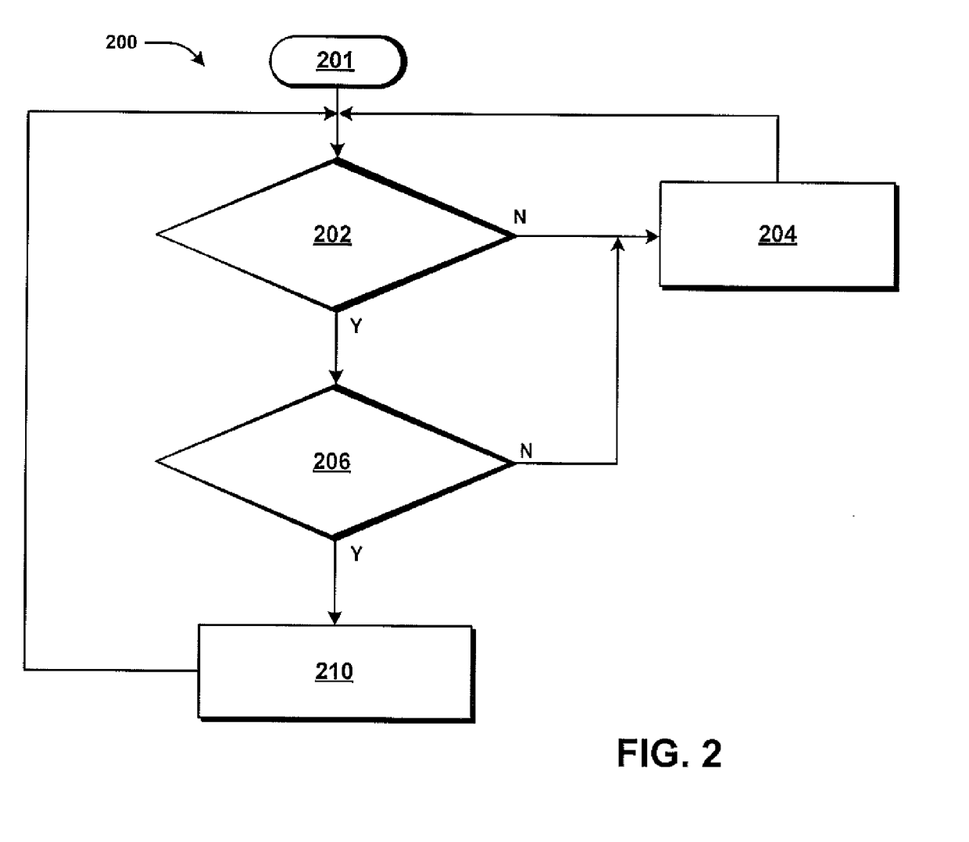
FIG. 2 illustrates an exemplary method for processing received broadcast messages having predicted values, according to an embodiment of the present disclosure.

FIG. 2 shows an exemplary method 200 for processing broadcast messages having predicted values, according to an embodiment of the present disclosure. It should be understood that the steps of the method 200 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims.

It should also be understood that the illustrated method 200 can be ended at any time. In certain embodiments, some or all steps of this process, and/or substantially equivalent steps are performed by execution of computer-readable instructions stored or included on a computer readable medium, for example. For instance, references to a processor performing functions of the present disclosure refer to any one or more interworking computing components executing instructions provided on a computer-readable medium, such as a memory associated with the processor.

The method 200 begins 201 and flow proceeds to step 202, whereat the processor of each receiving vehicle receives a broadcasted message having a predicted value $P_F$ and an actual value $A_F$. In some particular embodiments, the processor of the receiving vehicle determines that the message includes the predicted value $P_F$. If, in these particular embodiments, the processor determines that the message does not include a predicted value $P_F$, flow proceeds to step 204, whereat the processor authenticates the message and uses the actual value $A_F$. The receiver, based on one or more considerations, decides to verify either the lightweight or the heavyweight authenticator. For example, if the receiving vehicle has received and authenticated one or more messages from the same broadcasting vehicle earlier using a heavyweight authenticator, the receiving vehicle, depending on its programming, choose to verify the lightweight authenticator, otherwise a heavyweight authenticator is verified. From step 204, flow proceeds back to step 202 to receive and process a subsequently broadcasted message.

At step 206, the processor of the receiving vehicle determines whether the predicted value $P_F$ for the vehicle parameter bears a relation (e.g., a predetermined) to the actual present value $A_F$ for the vehicle parameter. The relationship can include any of the relationships described above in connection with the consideration of the broadcasting vehicle in step 108 of the method 100 described in connection with FIG. 1. For instance, in some embodiments, the processor of the receiving vehicle determines whether the predicted vale $P_F$ in the message is within a tolerance $T_{RV}$ of the actual value $A_F$ for the parameter. The tolerance $T_{RV}$ considered by the processor of the receiving vehicle may be the same or different than the tolerance $T_{BV}$ considered by the broadcasting vehicle in step 108 of the method 100 of FIG. 1.

In one specific embodiment, the processor of the receiving vehicle determines from the message that the broadcasting vehicle has already determined that values have a desired relationship, and so does not perform its own evaluation in step 206. The indicator may be the indicator described above in connection with step 108 of FIG. 1. In one embodiment, even if the processor of the receiving vehicle determines that the broadcasting vehicle found the predicted value $P_F$ to pass an evaluation of the broadcasting vehicle, the processor of the receiving vehicle still compares the predicted value $P_F$ and actual values $A_F$. For instance, the processor of the receiving vehicle may perform its evaluation regardless of the pass determination of the broadcasting vehicle, or may determine that the evaluation of the broadcasting vehicle was not stringent enough, and so proceeds to determine whether the predicted value $P_F$ satisfied more strict requirements (e.g., $T_{RV}$) of the receiving vehicle.

In the evaluation of step 206, the processor of the receiving vehicle, in some embodiments, considers the one or more applications of the receiving vehicle. For example, the processor of the receiving vehicle may consider that the information in the message related to location of the broadcasting vehicle will be used for an emergency braking application, or other collision-avoidance application of the receiving vehicle, versus a greeting message, for example.

The processor of a receiving vehicle may determine the accuracy of received data that it uses by selecting the signature to be verified. To obtain more precise data, more processing resources are required in order to process the heavyweight authenticators. If, on the other hand, the processor of a receiving vehicle can suffice with relatively less-accurate data and/or has low processing ability at the time, the processor can use the less-accurate predicted data by processing only the lightweight authenticating signature.

If the predicted value $P_F$ for the parameter does not bear the relationship, flow proceeds to step 204, whereat the processor of the receiving vehicle processes the lightweight tag and uses the actual value $A_F$, as mentioned above.

If the processor in step 206 determines that the predicted value $P_F$ for the parameter bears the relationship, flow proceeds to step 210, whereat the processor of the receiving vehicle (i) verifies the lightweight authenticating signature corresponding to the predicted value $P_F$ and (ii) uses the predicted value for one or more of its V2V applications.

From step 210, flow proceeds back to step 202 to receive and process a subsequent broadcasted message.

In these methods 100, 200, although the processor of the receiving vehicle uses capacity to process the heavyweight authenticating signature associated with the predicted value, benefits to the V2V system include security, as the predicted value message is verified by the processor of the receiving vehicle as a secure message via verification of the heavyweight authenticating signature. Security is also promoted as resources are made more available to process applications related to vehicle safety, which are often more computationally expensive, when they are less constrained by the MBAS authorization processing. Additional benefits to the V2V system include the time savings obtained by the broadcasting vehicle in generating and transmitting the message, described above, and in the continuing broadcasts and receipts by the participating vehicles. In addition, more accurate data can be provided than under previous systems due to the quickness with which data can be processed when the predicted value is within desired tolerance due obviating generation a heavyweight authenticating signature at the time of broadcast.

Intelligent MEDDS Authorization

Figure 3:
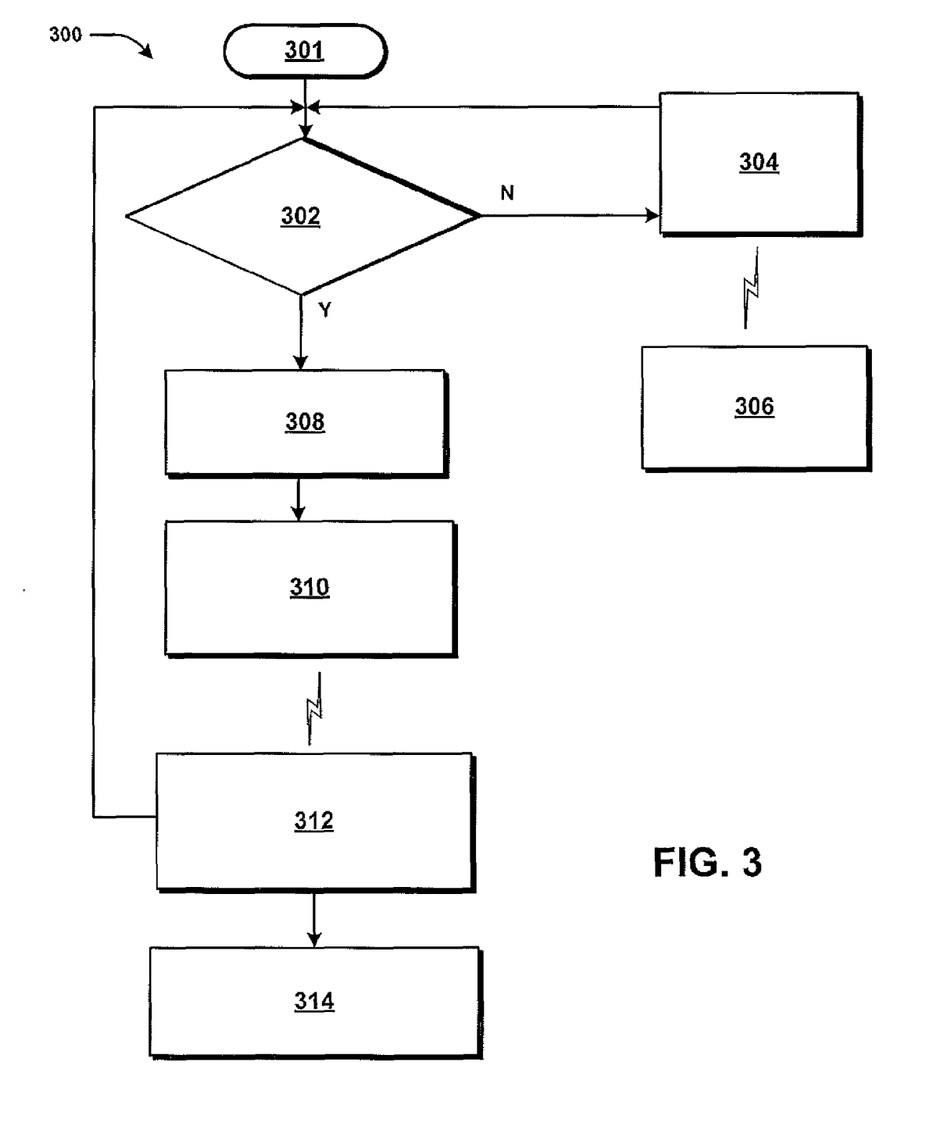
FIG. 3 illustrates an exemplary method for generating and processing messages including data having various accuracies and being secured by respective authenticating signatures having corresponding levels of security, according to an embodiment of the present disclosure

As described above, the present teachings can also be used with a Multiple ECDSA-based Digital Signature Scheme (MEDSS). FIG. 3 shows an exemplary method 300 for intelligent generation and processing messages including data having various accuracies and being secured by respective authenticating signatures having corresponding levels of security.

It should be understood that the steps of the method 300 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the illustrated method 300 can be ended at any time. In certain embodiments, some or all steps of this process, and/or substantially equivalent steps are performed by execution of computer-readable instructions stored or included on a computer readable medium, for example. For instance, references to a processor performing functions of the present disclosure refer to any one or more interworking computing components executing instructions provided on a computer-readable medium, such as a memory associated with the processor.

The method begins 301 and, at step 302, the broadcasting vehicle determines whether to predict a future value for its operating parameter. The determination of step 302 can include, for example, any of the considerations described above in connection with the determining step 102 of the method 100 illustrated in FIG. 1.

If at step 302 the broadcasting vehicle determines not to predict a future value for the operating parameter, flow proceeds to step 304, whereat the broadcasting vehicle prepares and broadcasts a message having an actual value for the vehicle parameter and an authenticating signature. In one embodiment, the broadcasting vehicle generates a heavyweight and a lightweight signature as the authenticating signature, such as according to the W-OTA/ECDSA scheme described above.

At step 306, the receiving vehicle (i) receives the broadcasted message having the actual value and authenticating signature, (ii) processes the authenticating signature to verify the message, and (iii) upon verification, uses the actual value for the operating parameter of the broadcasting vehicle.

If at step 302 the broadcasting vehicle determines not to predict a future value for the operating parameter, flow proceeds to step 308, whereat the broadcasting vehicle determines accuracy levels at which data will be prepared and broadcasted, and so corresponding authenticating-signature levels. For instance, the broadcasting vehicle may determine to prepare and broadcast a message including (1) a very-high accuracy value (e.g., an actual value) and (2) a lower-than very-high accuracy value (e.g., a predicted value). The broadcasting vehicle also decides to prepare corresponding authenticating signatures. In one embodiment, it is preferred that the processor of the broadcasting vehicle attaches unique signatures having various degrees of security to the data versions so that higher level signatures are connected to more accurate data. One or more of the signatures may be, for instance, elliptic-curve-cryptography (ECC) signatures.

In one embodiment, data includes high, moderate, and low accuracy versions, and the signatures include a corresponding high-security, heavyweight, security authenticator, a corresponding moderate security authenticator, and a corresponding relatively low-security, lightweight, authenticator. Less-than very-high levels of accuracy (e.g., less than an actual value) include any one or more of a variety of levels of predicted value. A predicted value can be more accurate if, for example, it is prepared using: more input factors; a more accurate (and so likely more costly in terms of computation and time) prediction algorithm; and/or input factors taken at a time closer to the time for which the data is predicted (e.g., a prediction made 0.3 seconds ahead of time is likely to be more accurate than a prediction made 1.5 seconds ahead).

As described, heavier authenticating signatures require correspondingly more computation, for generation by the processor of the broadcasting vehicle and processing by the processor of the receiving vehicle. Also, the level of security is proportionate to the processing requirement, and so generally also proportionate to the required processing time.

Flow proceeds to step 310, whereat the broadcasting vehicle prepares a message having the two or more versions of data for the same vehicle parameter, and corresponding one or more authenticating signatures. As described, the versions of data have various levels of accuracy, such as from actual, and thus highly-accurate data, to one or more levels of predicted, less-accurate data.

At step 312, the receiving vehicle receives the message broadcasted in step 310, and determines which level of data it prefers to use. Because in some embodiments more accurate data requires more processing resources and time, the receiving vehicle in some embodiments balances its need for accurate data (i.e., tolerance for inaccuracy) with its preference for limiting use of processing resources and processing time. Regarding tolerance for inaccuracy, the receiving vehicle may consider the needs or importance of the application(s) expected to use the value data for the broadcasting vehicle. For example, if the data is expected to be used for an emergency or safety application, then the tolerance for inaccuracy will be low and the receiving vehicle will determine in step 312 to access a value having a higher value, such as an actual value.

In some embodiments, the processor of the broadcasting and/or the receiving vehicle determines which of the various signatures to process. These determinations may include those described above in connection with 308 and 312, and may be performed based on variables such as (1) present and/or expected processing resources of one or both vehicles, (2) tolerance for inaccurate data of the application(s) of the receiving vehicle to use or expected to use the data in the message, (3) tolerance for delay in receiving data for the application(s) of the receiving vehicle to use or expected to use the data, and (4) desired level of security for the data in the message of the receiving vehicle.

At step 314, the receiving vehicle processes the authenticating signature corresponding to the value of the broadcasting vehicle operating parameter selected in step 312. Upon processing the signature, the receiving vehicle uses the selected value, Delayed-Authentication Protocol In some embodiments of the present disclosure, the processor of the broadcasting vehicle broadcasts messages with MBAS tag based on delayed authentication protocols. According to one protocol, a message is broadcast with an authenticating signature generated using an authenticating key. According to the protocol, the processor of the broadcasting vehicle broadcasts a message along with a code, such as a Message Authentication Code (MAC). The authenticating key required to verify the message is broadcasted in a subsequent message separated from the first in a predetermined manner according to the protocol. This protocol, TESLA (Timed Efficient Stream Loss tolerant Authentication), is well known in the art, and so not described in further detail.

A drawback of using delayed authentication protocols such as TESLA is that data may become stale by the time that the receiving processor is able to verify authenticity of the message in which it is sent. For example, vehicle parameters of the broadcasting vehicle broadcast at time=0 may not accurately reflect the vehicle parameter at the subsequent time, when the authenticating key is received at a later time to confirm the data from time=0.

In order to address shortcomings including the aforementioned drawback of using delayed authentication protocols such as TESLA, the broadcasting vehicle predicts certain components/parts of the message to be broadcasted prior to sending the authentication key to verify the message. For example, a broadcasting vehicle will predict a vehicular location and other necessary components and generate a message authentication code which is then transmitted. The receiving vehicle on receipt of the message will hold onto the message until a corresponding authentication key is sent to it by the broadcasting vehicle. When the corresponding authentication key is sent and the message is authenticated, the contents of the message, since they were predicted will reflect the position of the vehicle at that time instant (the time during which the authentication key was released), rather than the instant of time during which the MAC was generated.

Two primary delayed-authentication protocols are contemplated. One is referred to herein as a transmitter-centric policy. In the transmitter-centric policy, the broadcasting vehicle (BV) determines (e.g., on a broadcast-by-broadcast basis) whether to predict a vehicle parameter for a subsequent broadcast at a future time or broadcast the actual value at the future time. Another delayed-authentication protocol is referred to herein as a receiver-centric policy. In the receiver-centric policy, the receiving vehicle (RV) receives both an advanced, predicted value and an actual value, and determines whether to suffice with less-accurate information (e.g., predicted information), which is accompanied by a less-computationally intensive authenticating signature, or to use the more accurate information, which is accompanied by a relatively more-computationally intensive authenticating signature. These policies are described in further detail below.

Transmitter-Centric Policy

Figure 4:
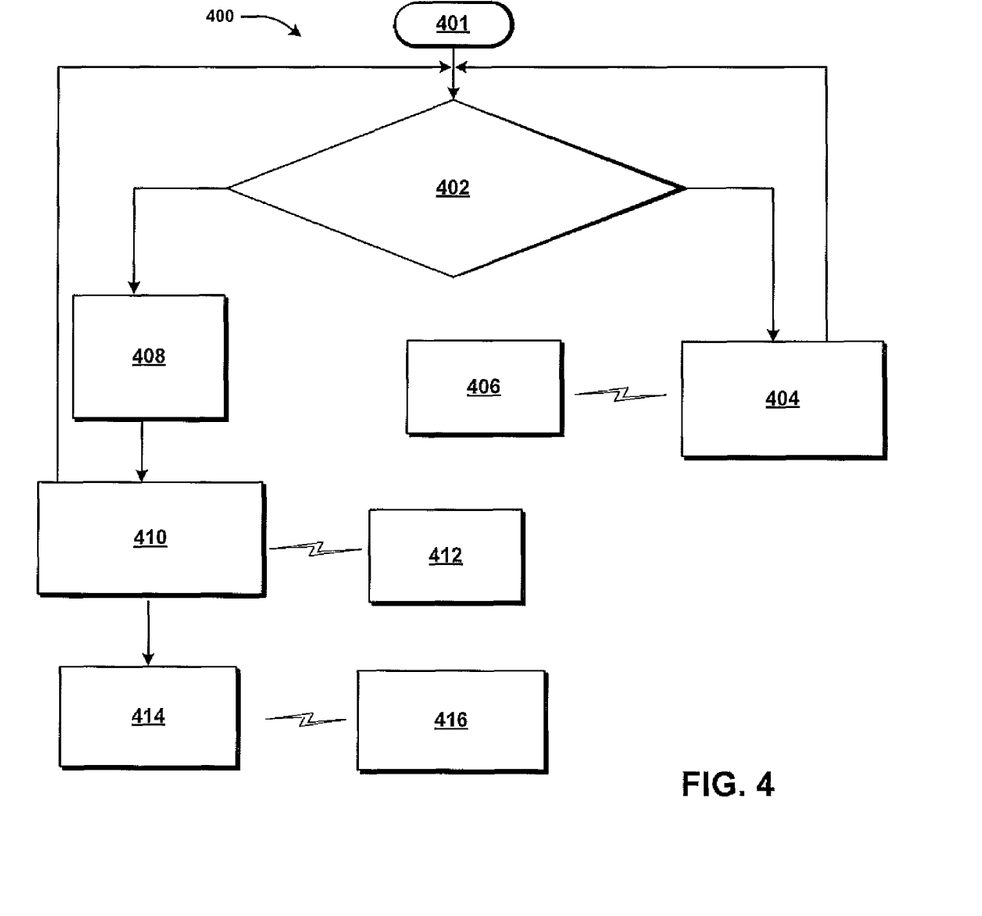
FIG. 4 illustrates an exemplary method for selectively broadcasting and processing a secure message including a predicted value of a vehicle parameter, according to an embodiment of the present disclosure.

FIG. 4. shows an exemplary method 400 for selectively generating and broadcasting a message including at least one predicted vehicle parameter and at least one authenticating signature to be verified later by a receiving vehicle using an authenticating key received from the broadcasting vehicle in a subsequent message, according to an embodiment of the present disclosure. It should be understood that the steps of the method 400 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the illustrated method 400 can be ended at any time.

In certain embodiments, some or all steps of this process, and/or substantially equivalent steps are performed by execution of computer-readable instructions stored or included on a computer readable medium, for example. For instance, references to a processor performing functions of the present disclosure refer to any one or more interworking computing components executing instructions provided on a computer-readable medium, such as a memory associated with the processor.

The method 400 begins 401 and flow proceeds to step 402, whereat the processor of the broadcasting vehicle determines whether to predict a future value $P_F$ for at least one vehicle parameter (e.g., broadcasting vehicle location) with respect to a future time (e.g., time=F, such as 1 second into the future) or broadcast at the future time an actual value for the vehicle parameter.

In making the determination of step 402, the broadcasting vehicle can consider any one or more variables including a present level of processing for the vehicle, an expected level of processing for the vehicle at about the future time, and characteristics of one or more applications of the receiving vehicle(s) expected to utilize the information, such as a sensitivity or tolerance for accurate/inaccurate information and a required or preferred security level for the information. The consideration may include features of those described above in connection with steps 102 and 302 of the methods 100 and 300 illustrated in FIGS. 1 and 3, respectively.

For instance, the broadcasting vehicle may be programmed so that if (1) its present processing level is high and/or its future processing level is expected to be high, and (2) the application of the receiving vehicle expected to utilize the subject vehicle parameter information does not require highly-accurate data (e.g., if it is not an emergency/safety feature), then the broadcasting vehicle determines to predict the future value.

If the broadcasting vehicle in step 402 determines not to predict the future value, then flow proceed to step 404, whereat the broadcasting vehicle, at or about the future time, generates and broadcasts a message $M_A$ including the actual value $A_F$ for the vehicle parameter and an authenticating signature $S_A$. The authenticating signature $S_A$ in various embodiments includes, for example, one or more authenticators according to the ECDSA scheme or W-OTA/ECDSA scheme, described above. At step 406, the receiving vehicle receives and processes the subsequent, future message $M_F$, and uses the actual value $A_F$ therein.

If the broadcasting vehicle in step 402 determines not to predict the future value, then flow proceed to step 408, whereat the broadcasting vehicle computes a predicted value $P_F$ corresponding to the future time (time=F), such as described above with respect to step 106 of the method 100 described in connection with FIG. 1.

At step 410, the broadcasting vehicle prepares an initial message $M_0$ including the predicted future value $P_F$ for the vehicle parameter and a signature $S_F$ generated using an authenticating signature $K_F$. The authenticating signature $S_F$ may include, for example, one or more authenticators according to the ECDSA scheme or W-OTA/ECDSA scheme, described above. In one embodiment, it is preferred that the authenticating signature $S_0$ be a relatively-lightweight authenticating signature, which, for example, reduces processing resources and time for the broadcasting vehicle in generating the signature and for the receiving vehicle in later verifying the signature.

At step 412, the receiving vehicle receives the message $M_0$ including the predicted future value $P_F$ and the corresponding signature $S_0$. The processor of the receiving vehicle does not yet have the authenticating key $K_F$ with which to confirm the signature $S_F$.

At step 414, at or just before the future time, the broadcasting vehicle generates and broadcasts a subsequent message $M_F$ including the authenticating key $K_F$ corresponding to the signature $S_F$ provided with the initial message $M_0$. The broadcasting vehicle generating and broadcasting the subsequent message $M_F$ is separated from the broadcasting the initial message $M_0$ according to the protocol. For example, in some embodiments the subsequent message $M_F$ is separated from the first message $M_0$ by an amount of time, such as 0.5 second or 1 second. In one contemplated embodiment, the subsequent message $M_F$ is separated from the first message $M_0$ by a number of messages.

At step 416, the receiving vehicle receives the subsequent message $M_F$ including the authenticating key $K_F$ for confirming the signature $S_F$ transmitted with the previous messages $M_0$. Being programmed with the prediction-based delayed-authentication protocol, the receiving vehicle is aware that the authenticating key $K_F$ received with the message $M_F$ corresponds to the signature $S_F$ received in the previous message $M_0$, and so uses the subsequently-received authenticating key $K_F$ to authenticate the previous message $M_0$. Upon authenticating the previous message $M_0$, the receiving vehicle obtains and then uses the predicted value for the subject vehicle parameter.

Receiver-Centric Policy

Figure 5:
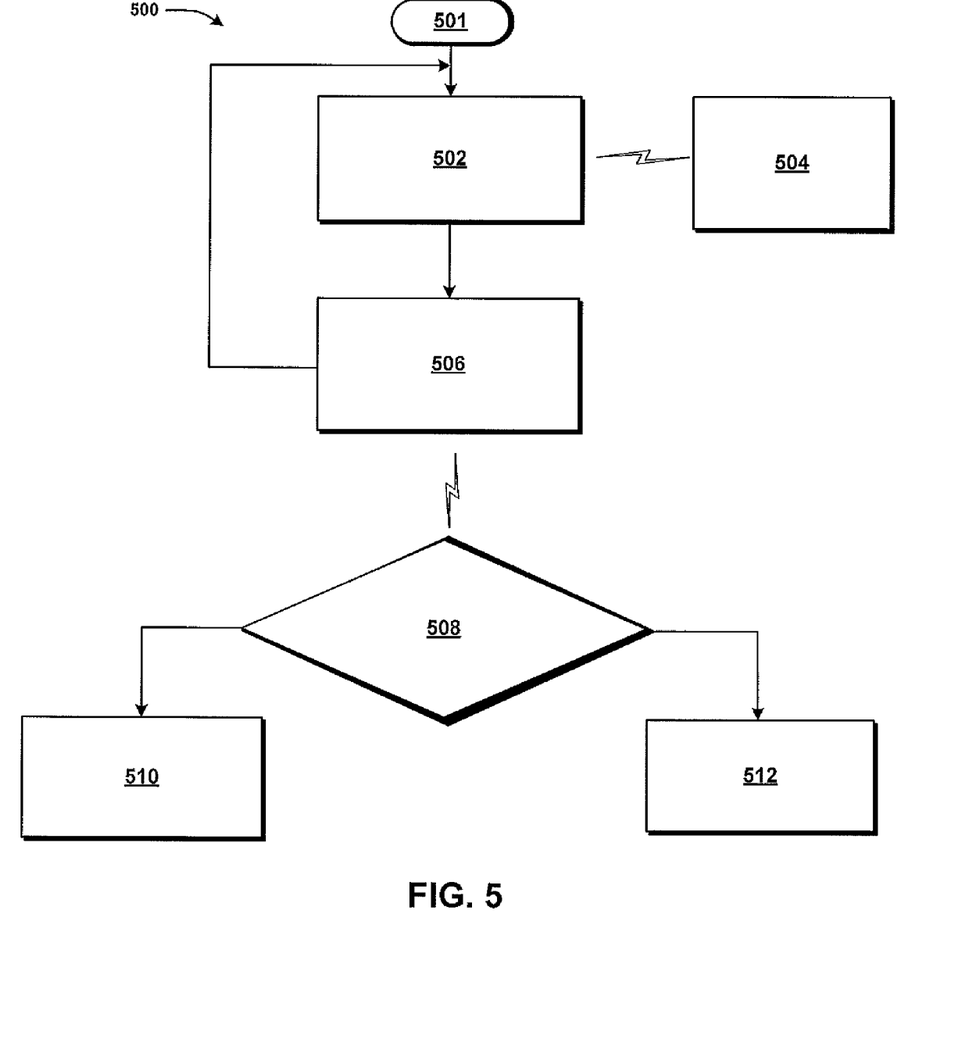
FIG. 5 illustrates an exemplary method including a receiving vehicle selectively accessing a predicted value or an actual value received from a broadcasting vehicle, according to an embodiment of the present disclosure.

FIG. 5 illustrates an exemplary method 500 according to the receiver-centric policy, whereby a receiving vehicle selectively accessing a predicted value or an actual value received from a broadcasting vehicle. It should be understood that the steps of the method 500 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the illustrated method 500 can be ended at any time.

In certain embodiments, some or all steps of the method 500, and/or substantially equivalent steps are performed by execution of computer-readable instructions stored or included on a computer readable medium, for example. For instance, references to a processor performing functions of the present disclosure refer to any one or more interworking computing components executing instructions provided on a computer-readable medium, such as a memory associated with the processor.

The method 500 begins 501 and flow proceeds to step 502, whereat, at about a present time (time=0) the processor of the broadcasting vehicle predicts a future value $P_F$ for at least one vehicle parameter (e.g., broadcasting vehicle location), generates an authenticating signature $S_P$ to correspond with the predicted value $P_F$, and broadcasts an initial message $M_0$ including the predicted value and the authenticating signature $S_P$.

The processor of the broadcasting vehicle computes the predicted value $P_F$, for example, as described above with respect to step 106 of the method 100 described in connection with FIG. 1. The broadcasting vehicle generates the authenticating signature $S_P$ corresponding to the predicted value $P_F$, for example, as described above in connection with step 410 of the method 400 illustrated in FIG. 4. Namely, the broadcasting vehicle generates the authenticating signature $S_P$ corresponding to the predicted value $P_F$ using an authenticating key $K_F$.

At step 504, the receiving vehicle receives the initial message $M_0$ having the predicted future value $P_F$ and the corresponding signature $S_P$. The receiving vehicle does not yet have the authenticating key $K_F$ with which to confirm the signature $S_P$.

At step 506, the broadcasting vehicle, at or about the future time (time=F), determines an actual value $A_F$ for the vehicle parameter corresponding with the future time, and generates an authenticating signature $S_A$ to associate with the actual value $A_F$. The authenticating signature $S_A$ in various embodiments includes, for example, one or more authenticators according to the ECDSA or W-OTA/ECDSA schemes, described above. In one embodiment, it is preferred to associate a relatively-heavyweight authenticating signature with the actual value $A_F$. At step 506, the broadcasting vehicle also generates and broadcasts a subsequent message $M_F$ having the actual value $A_F$ and the corresponding authenticating signature $S_A$.

At step 508, the receiving vehicle receives the subsequent message $M_F$ having the actual value $A_F$, the authenticating signature $S_A$, and the key $K_F$. Before or upon receipt of the subsequent message $M_A$, the receiving vehicle determines whether to process the authenticating signature $S_F$, received in the initial message $M_P$ for using the predicted value $P_F$ for the vehicle parameter or to process the authenticating signature $S_A$ received in the subsequent message $M_F$ for using the actual value $A_F$ for the vehicle parameter.

In some embodiments, the receiving vehicle makes the determination of step 508 based upon one or more variables such as a present level of processing for the receiving vehicle, and characteristics of one or more applications of the receiving vehicles to utilize the information. These characteristics may be like those mentioned above, including, for instance, a sensitivity or tolerance for accurate/inaccurate information, and a security level required or preferred by the receiving vehicle for the information.

In some embodiments, the receiving vehicle, in determining whether to use the actual or predicted values $A_F$, $P_F$, accesses and compares the values, themselves. Specifically, for example, the receiving vehicle compares the values $A_F$, $P_F$ to determine if the predicted value $P_F$ is within a threshold of the actual value $P_F$, such as a threshold associated with a tolerance of the receiving vehicle to inaccuracy. This process in various embodiments, involves considerations similar to those described in connection with the evaluation steps 108 and 206 performed by broadcasting and receiving vehicles in methods 100 and 200, respectively.

If the receiving vehicle determines at step 508 to obtain the actual value $A_F$ for the broadcasting vehicle parameter, flow proceeds to step 510, whereat the receiving vehicle processes the authenticating signature $S_A$ according to authenticating processes described above, such as described above in connection with step 406 of the method 400 illustrated in FIG. 4.

Upon processing the authenticating signature $S_A$, the receiving vehicle uses the actual value $A_F$ for the vehicle parameter.

If the receiving vehicle determines at step 508 to obtain the predicted value $P_F$ for the broadcasting vehicle parameter, flow proceeds to step 512, whereat the receiving vehicle processes the signature $S_P$ transmitted with the initial message $M_O$, using the authenticating key $K_F$ received with the subsequent message $M_F$, such as described above in connection with step 416 of the method 400 illustrated in FIG. 4.

Various embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A method, for securing communications between automotive vehicles in a vehicle-to-vehicle communications system, comprising:

predicting, by an on-board computer of a broadcasting vehicle, a future value for a vehicle parameter, yielding a predicted future-vehicle-parameter value, the predicted future-vehicle-parameter value corresponding to a pre-identified future time;

generating, by the on-board computer of the broadcasting vehicle, a heavyweight authenticating signature to correspond to the predicted future-vehicle-parameter value;

obtaining, by the on-board computer of the broadcasting vehicle, subsequent to predicting the predicted future-vehicle-parameter value and generating the heavyweight authenticating signature to correspond to the predicted future-vehicle-parameter value, an actual value for the vehicle parameter, yielding an actual-vehicle-parameter value;

comparing, by the on-board computer of the broadcasting vehicle, in a first comparison, the predicted future-vehicle-parameter value for the vehicle parameter to the actual-vehicle-parameter value for the vehicle parameter to determine whether the predicted future-vehicle-parameter value for the vehicle parameter bears a first relationship to the actual-vehicle-parameter value for the vehicle parameter; and in response to the on-board computer of the broadcasting vehicle determining in the first comparison that the predicted future-vehicle-parameter value bears the first relationship to the actual-vehicle-parameter value:

generating, by the on-board computer of the broadcasting vehicle, a lightweight authenticating signature to correspond to the predicted future-vehicle-parameter value, the lightweight authenticating signature having a lower security level than the heavyweight authenticating signature; and broadcasting, by the on-board computer of the broadcasting vehicle, a data message having the predicted future-vehicle-parameter value, the actual-vehicle-parameter value, the corresponding heavyweight authenticating signature, and the corresponding lightweight authenticating signature;

receiving, by an on-board computer of a receiving vehicle, the data message broadcasted by the on-board computer of the broadcasting vehicle;

comparing, by the on-board computer of the receiving vehicle, in a second comparison, the predicted future-vehicle-parameter value to the actual-vehicle-parameter value to determine whether the predicted future-vehicle-parameter value bears a second predetermined relationship to the actual-vehicle-parameter value; and in response to the on-board computer of the receiving vehicle determining, in the second comparison, that the predicted future-vehicle-parameter value bears the second relationship to the actual-vehicle-parameter value:

processing, by the on-board computer of the receiving vehicle, the heavyweight authenticating signature and the lightweight authenticating signature to verify the predicted future-vehicle-parameter value; and utilizing, by the on-board computer of the receiving vehicle, after verifying the predicted future-vehicle-parameter value, the predicted future-vehicle-parameter value.

2. The method of claim 1, further comprising:

determining, by the on-board computer of the broadcasting vehicle, in a determining step, whether to predict the future-vehicle-parameter value of the vehicle parameter;

wherein the on-board computer of the broadcasting vehicle predicts the future-vehicle-parameter value for the vehicle parameter in response to a positive result in the determining step.

3. The method of claim 1, wherein comparing, by the on-board computer of the broadcasting vehicle, the predicted future-vehicle-parameter value for the vehicle parameter to the actual-vehicle-parameter value for the vehicle parameter to determine whether the predicted future-vehicle-parameter value bears the first relationship to the actual-vehicle-parameter value for the vehicle parameter, comprises determining whether the predicted future-vehicle-parameter value is within a threshold value of the actual-vehicle-parameter value.

4. The method of claim 1, wherein comparing, by the on-board computer of the receiving vehicle, the predicted future-vehicle-parameter value to the actual-vehicle-parameter value to determine whether the predicted future-vehicle-parameter value bears the second predetermine relationship to the actual-vehicle-parameter value, comprises determining whether the predicted future-vehicle-parameter value is within a pre-determined threshold of the actual-vehicle-parameter value.

5. The method of claim 1, wherein the method further comprises performing, in response to the on-board computer of the broadcasting vehicle determining, in the first comparison, that the predicted future-vehicle-parameter value does not bear the first relationship to the actual-vehicle-parameter value, operations comprising:

generating, by the on-board computer of the broadcasting vehicle, a heavyweight authenticating signature to correspond to the actual-vehicle-parameter value;

generating a lightweight authenticating signature to correspond to the actual-vehicle-parameter value; and preparing and broadcasting a message including the actual-vehicle-parameter value and the heavyweight and lightweight authenticating signatures corresponding to the actual-vehicle-parameter value.

6. The method of claim 1, wherein the method further comprises performing, in response to the on-board computer of the receiving vehicle determining, in the second comparison, that the predicted future-vehicle-parameter value does not bear the second relationship to the actual-vehicle-parameter value, operations comprising:

processing, by the on-board computer of the receiving vehicle, the heavyweight authenticating signature and/or the lightweight authenticating signature to verify the actual-vehicle-parameter value; and utilizing, by the on-board computer of the receiving vehicle, after verifying the actual-vehicle-parameter value, the actual-vehicle-parameter value.

7. A method, for securing communications between automotive vehicles in a vehicle-to-vehicle communications system according to a prediction-and-multiple-authenticator protocol, comprising:

generating, by an on-board computer of the broadcasting vehicle, a first value for a vehicle parameter, yielding a generated actual vehicle-parameter value;

preparing, by the on-board computer of the broadcasting vehicle, a first authenticating signature, having a first security level, to correspond with the generated actual vehicle-parameter value;

predicting, by the on-board computer of the broadcasting vehicle, a second, future value for the vehicle parameter having lower accuracy than an accuracy of the first value for the vehicle parameter, yielding a predicted future-vehicle-parameter value;

generating, by the on-board computer of the broadcasting vehicle, a second authenticating signature to correspond with the predicted future-vehicle-parameter value for the vehicle parameter, the second authenticating signature having a lower security level than the security level of the first authenticating signature;

preparing and broadcasting, by the on-board computer of the broadcasting vehicle, a data message including the generated actual vehicle-parameter value, the predicted future-vehicle-parameter value, and the corresponding authenticating signatures;

receiving, by an on-board computer of a receiving vehicle, the data message;

determining, by the on-board computer of the receiving vehicle, which level of data accuracy is preferred;

processing, by the on-board computer of the receiving vehicle, the authenticating signature corresponding to the level of data accuracy preferred; and utilizing, by the on-board computer of the receiving vehicle, the data having the preferred accuracy;

wherein:

predicting, by the on-board computer of the broadcasting vehicle, the predicted future-vehicle-parameter value includes predicting the future-vehicle-parameter value to be a relatively high-accuracy prediction of the vehicle parameter;

preparing by the on-board computer of the broadcasting vehicle, the first authenticating signature includes preparing the first authenticating signature to have a relatively-high level of security;

the method further comprises:

predicting, by the on-board computer of the broadcasting vehicle, with relatively moderate accuracy a third, moderate-accuracy predicted value for the vehicle parameter; and generating, by the on-board computer of the broadcasting vehicle, a relatively moderate-security authenticating signature to correspond with the moderate-accuracy predicted value for the vehicle parameter; and preparing and broadcasting, by the on-board computer of the broadcasting vehicle, the data message comprises preparing the message to include the actual-vehicle-parameter value, the predicted future-vehicle-parameter value, the third, moderate-accuracy value, and the corresponding authenticating signatures.

8. The method of claim 7, further comprising:

determining, by the on-board computer of the broadcasting vehicle, levels at which to prepare values for the vehicle parameter;

wherein the on-board computer of the broadcasting vehicle generates the actual vehicle-parameter value and prepares the predicted future-vehicle-parameter value in response to determining (i) to prepare the actual vehicle-parameter value having an accuracy that the actual vehicle-parameter value is prepared to have and (ii) to prepare the future-vehicle-parameter value having an accuracy that the future-vehicle-parameter value is prepared to have.

9. The method of claim 7, wherein preparing, by the on-board computer of the broadcasting vehicle, the authenticating signature to correspond with the actual-vehicle-parameter value for the vehicle parameter includes preparing the authenticating signature to have a very-high level of security.

10. The method of claim 7, further comprising:

determining, by the on-board computer of the broadcasting vehicle, whether to predict any future value of the vehicle parameter;

wherein a group of steps, performed in response to a positive result from the determining, comprise:

(1) generating, by the on-board computer of the broadcasting vehicle, the actual-vehicle-parameter value for the vehicle parameter;

(2) preparing, by the on-board computer of the broadcasting vehicle, the relatively high-security authenticating signature;

(3) preparing, by the on-board computer of the broadcasting vehicle, the predicted future-vehicle-parameter value for the vehicle parameter;

(4) generating, by the on-board computer of the broadcasting vehicle, the security authenticating signature;

(5) preparing and broadcasting, by the on-board computer of the broadcasting vehicle, the data message;

(6) receiving, by the on-board computer of the receiving vehicle, the data message;

(7) determining, by the on-board computer of the receiving vehicle, which level of data accuracy it prefers;

(8) processing, by the on-board computer of the receiving vehicle, the authenticating signature corresponding to the preferred level of data accuracy; and (9) utilizing, by the on-board computer of the receiving vehicle, the data having the preferred accuracy.

11. A method, for securing communications between automobiles in a vehicle-to-vehicle communications system according to a delayed-authentication protocol, comprising:
- determining, by an on-board computer of a broadcasting vehicle, in a determination, whether to predict a future value for a vehicle parameter;
- performing, in response to the on-board computer of the broadcasting vehicle determining, in the determination, to predict the future value, operations comprising:
  - predicting, by the on-board computer of the broadcasting vehicle, the future value for the vehicle parameter, yielding a predicted future-vehicle parameter value;
  - generating, by the on-board computer of the broadcasting vehicle, using an authenticating key, an authenticating signature to correspond to the predicted future-vehicle parameter value;
  - preparing and broadcasting, by the on-board computer of the broadcasting vehicle, an initial predicted-value message including the predicted future-vehicle parameter value and the corresponding authenticating signature; and
  - preparing and broadcasting, by the on-board computer of the broadcasting vehicle, a subsequent predicted-value message including the authenticating key, for use by receiving vehicles to: authenticate the authenticating signature received in the initial predicted-value message for using the predicted future-vehicle parameter value received in the initial predicted-value message; and
- performing, in response to the on-board computer of the broadcasting vehicle determining in the determining not to predict the future-vehicle parameter value, operations comprising:
  - preparing, by the on-board computer of the broadcasting vehicle, an actual-vehicle parameter value for the vehicle parameter;
  - generating, by the on-board computer of the broadcasting vehicle, an authenticating signature to correspond to the actual-vehicle parameter value; and
  - broadcasting, by the on-board computer of the broadcasting vehicle, an actual-value message including the actual-vehicle parameter value and the corresponding authenticating signature.

12. The method of claim 11, wherein the determination comprises evaluation of needs of an application of at least one of the receiving vehicles.

13. A method, for securing communications between automobiles in a vehicle-to-vehicle communications system according to a delayed-authentication protocol, comprising:
- predicting, by an on-board computer of a broadcasting vehicle, a future-vehicle parameter value for a vehicle parameter;
- generating, by the on-board computer of the broadcasting vehicle, a first authenticating signature, using an authenticating key, to correspond to the predicted future-vehicle parameter value;
- preparing and generating, by the on-board computer of the broadcasting vehicle, an initial message including the predicted future-vehicle parameter value and first authenticating signature;
- preparing, by the on-board computer of the broadcasting vehicle, an actual-vehicle parameter value of the vehicle parameter;
- generating, by the on-board computer of the broadcasting vehicle, a second authenticating signature to correspond to the actual-vehicle parameter value;
- preparing and broadcasting, by the on-board computer of the broadcasting vehicle, a subsequent message including the actual-vehicle parameter value, the second authenticating signature, and the authenticating key used to generate the first authenticating signature, so that receiving vehicles can determine which of the first authenticating signature and the second authenticating signature to process for accessing the predicted future-vehicle parameter value or the actual-vehicle parameter value, respectively;
- receiving, by an on-board computer of a receiving vehicle, the broadcasted initial message;
- receiving, by the on-board computer of the receiving vehicle, the broadcasted subsequent message; and
- determining, by the on-board computer of the receiving vehicle, whether to process the first authenticating signature for authenticating the predicted future-vehicle parameter value or to process the second authenticating signature for authenticating the actual-vehicle parameter value;
- wherein determining, by the on-board computer of the receiving vehicle, whether to process the first authenticating signature, using the authenticating key, for authenticating the predicted future-vehicle parameter value, or to process the second authenticating signature for authenticating the actual-vehicle parameter value, includes considering needs of an application of the receiving vehicle.

14. The method of claim 13, further comprising:
- authenticating, by the on-board computer of the receiving vehicle, in response to the on-board computer of the receiving vehicle determining to process the first authenticating signature for authenticating the predicted future-vehicle parameter value, using the authenticating key received in the initial message, the first authenticating signature; and
- utilizing, by the on-board computer of the receiving vehicle, in response to the authenticating the first authenticating signature, the predicted future-vehicle parameter value.

15. The method of claim 13, further comprising authenticating, by the on-board computer of the receiving vehicle, in response to the on-board computer of the receiving vehicle determining to process the second authenticating signature for authenticating the predicted future-vehicle parameter value, the second authenticating signature and, upon the authentication, uses the actual-vehicle parameter value.

16. A method, for securing communications between automotive vehicles in a vehicle-to-vehicle communications system according to a prediction-and-multiple-authenticator protocol, comprising:
- generating, by an on-board computer of a broadcasting vehicle, a first value for a vehicle parameter, yielding a generated actual vehicle-parameter value;
- preparing, by the on-board computer of the broadcasting vehicle, a first authenticating signature, having a first security level, to correspond with the generated actual vehicle-parameter value;
- predicting, by the on-board computer of the broadcasting vehicle, a second, future value for the vehicle parameter having lower accuracy than an accuracy of the first value for the vehicle parameter, yielding a predicted future-vehicle-parameter value;
- generating, by the on-board computer of the broadcasting vehicle, a second authenticating signature to correspond with the predicted future-vehicle-parameter value for the vehicle parameter, the second authenticating signature having a lower security level than the security level of the first authenticating signature;

preparing and broadcasting, by the on-board computer of the broadcasting vehicle, a data message including the generated actual vehicle-parameter value, the predicted future-vehicle-parameter value, and the corresponding authenticating signatures;

receiving, by an on-board computer of a receiving vehicle, the data message;

determining, by the on-board computer of the receiving vehicle, which level of data accuracy is preferred;

processing, by the on-board computer of the receiving vehicle, the authenticating signature corresponding to the level of data accuracy preferred;

utilizing, by the on-board computer of the receiving vehicle, the data having the preferred accuracy; and determining, by the on-board computer of the broadcasting vehicle, whether to predict any future value of the vehicle parameter;

wherein a group of steps, performed in response to a positive result from the determining, comprise:

(1) generating, by the on-board computer of the broadcasting vehicle, the actual-vehicle-parameter value for the vehicle parameter;

(2) preparing, by the on-board computer of the broadcasting vehicle, the first authenticating signature;

(3) preparing, by the on-board computer of the broadcasting vehicle, the predicted future-vehicle-parameter value for the vehicle parameter;

(4) generating, by the on-board computer of the broadcasting vehicle, the second authenticating signature;

(5) preparing and broadcasting, by the on-board computer of the broadcasting vehicle, the data message;

(6) receiving, by the on-board computer of the receiving vehicle, the data message;

(7) determining, by the on-board computer of the receiving vehicle, which level of data accuracy it prefers;

(8) processing, by the on-board computer of the receiving vehicle, the authenticating signature corresponding to the preferred level of data accuracy; and (9) utilizing, by the on-board computer of the receiving vehicle, the data having the preferred accuracy.

17. A method, for securing communications between automobiles in a vehicle-to-vehicle communications system according to a delayed-authentication protocol, comprising:

predicting, by an on-board computer of a broadcasting vehicle, a future-vehicle parameter value for a vehicle parameter;

generating, by the on-board computer of the broadcasting vehicle, a first authenticating signature, using an authenticating key, to correspond to the predicted future-vehicle parameter value;

preparing and generating, by the on-board computer of the broadcasting vehicle, an initial message including the predicted future-vehicle parameter value and first authenticating signature;

preparing, by the on-board computer of the broadcasting vehicle, an actual-vehicle parameter value of the vehicle parameter;

generating, by the on-board computer of the broadcasting vehicle, a second authenticating signature to correspond to the actual-vehicle parameter value; and preparing and broadcasting, by the on-board computer of the broadcasting vehicle, a subsequent message including the actual-vehicle parameter value, the second authenticating signature, and the authenticating key used to generate the first authenticating signature, so that receiving vehicles can determine which of the first authenticating signature and the second authenticating signature to process for accessing the predicted future-vehicle parameter value or the actual-vehicle parameter value, respectively;

receiving, by an on-board computer of a receiving vehicle, the broadcasted initial message;

receiving, by the on-board computer of the receiving vehicle, the broadcasted subsequent message;

determining, by the on-board computer of the receiving vehicle, whether to process the first authenticating signature for authenticating the predicted future-vehicle parameter value or to process the second authenticating signature for authenticating the actual-vehicle parameter value; and authenticating, by the on-board computer of the receiving vehicle, in response to the on-board computer of the receiving vehicle determining to process the second authenticating signature for authenticating the predicted future-vehicle parameter value, the second authenticating signature and, upon the authentication, uses the actual-vehicle parameter value.

* * * * *